(12) United States Patent
Sankaranarayanan

(10) Patent No.: US 12,468,843 B2
(45) Date of Patent: Nov. 11, 2025

(54) SECURING MACHINE LEARNING (ML) PIPELINES USING DATA LOSS PREVENTION

(71) Applicant: Google LLC, Mountain View, CA (US)

(72) Inventor: Hari Bhaskar Sankaranarayanan, Bangalore (IN)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 18/210,840

(22) Filed: Jun. 16, 2023

(65) Prior Publication Data

US 2024/0419837 A1 Dec. 19, 2024

(51) Int. Cl.
*H04L 29/06* (2006.01)
*G06F 21/60* (2013.01)
*G06F 21/62* (2013.01)

(52) U.S. Cl.
CPC ........ *G06F 21/6245* (2013.01); *G06F 21/604* (2013.01); *G06F 2221/2113* (2013.01); *G06F 2221/2141* (2013.01)

(58) Field of Classification Search
CPC .............. G06F 21/6245; G06F 21/604; G06F 2221/2113; G06F 2221/2141
See application file for complete search history.

(56) References Cited

U.S. PATENT DOCUMENTS 11,330,003 B1 * 5/2022 Howell ............... H04L 63/1425
2024/0370584 A1 * 11/2024 Singh .................. H04L 63/1425

* cited by examiner

*Primary Examiner* — Evans Desrosiers
(74) *Attorney, Agent, or Firm* — Lerner David LLP

(57) ABSTRACT

Aspects of the disclosed technology include techniques and mechanisms for securing machine learning (ML) training pipelines and ML pipeline models using data loss prevention (DLP). A DLP ML engine may use different levels of detection to determine whether a command manipulates or disseminates sensitive data. The DLP ML engine may progress through the different levels of detection where each level of detection may engage different methods for determining whether the command is used for generative AI purposes. Based on determining a command is not used for generative AI purposes, the DLP ML engine may allow execution of the command. Alternatively, based on determining the command is used for generative AI purposes, the DLP ML engine may trigger preventive measures.

20 Claims, 9 Drawing Sheets

SECURING MACHINE LEARNING (ML) PIPELINES USING DATA LOSS PREVENTION

BACKGROUND

Machine learning (ML) pipelines may be used to train ML models, which may execute a plurality of industry-specific tasks. The data that is used to train the ML models may consist of sensitive and confidential data (collectively "sensitive data") that may originate from sources such as enterprise-specific datasets, datasets stored in collaborative cloud environments, or the like. In some instances, sensitive data used to train the ML models may also be used for generative artificial intelligence (AI) that may relate to and be used during the execution of the plurality of industry-specific tasks. However, using sensitive data in generative AI may subject the data to unintentional dissemination, thereby leading to potential data loss and other security risks.

In some instances, particular data, datasets, or portions of datasets may be whitelisted for use in ML models (or blacklisted from use in ML models). However, even when data or datasets are whitelisted for use in ML models, using sensitive data for generative AI may be prohibited. For example, an employee of an enterprise organization, such as a machine learning engineer working on Human Resources analytics, may study current salary distributions using confidential enterprise organization data using at least one ML model. The ML engineer may have access to the salary data as an authorized power user. The ML engineer may instantiate an instance of a cloud computing environment and manipulate the salary data using commands of a generative AI model. The output of the generative AI model may include the salary data, which is sensitive data and should not be shared to those without access. However, since the salary data is included in the output of the generative AI model, sharing of the output of the generative AI model may result in the disclosure of the sensitive data to unauthorized individuals. Although the foregoing example describes the sensitive data being enterprise organization data, the sensitive data may come from other sources, such as analysts or industry recruiters.

Data protection controls for training ML models typically emphasize (1) asset classification access control and (2) command execution control. However, such controls may not account for the unauthorized release of sensitive data created by generative AI models. Asset classification access control may consist of monitoring requests to access data and determining whether to grant access to the data based on an authorization or clearance level associated with the party requesting access. Command execution control may consist of monitoring the commands executed using the sensitive data and determining whether the executed commands are permitted (whitelisted). However, even parties that are authorized to access the sensitive data and authorized to execute permitted commands on the sensitive data may experience instances where the data is unintentionally (or intentionally) manipulated or disseminated. For example, the enterprise organization may collaborate with an IT services provider to generate and train a chatbot to answer questions from employees of the enterprise organization. The enterprise organization may regularly share sensitive financial information and documents with the IT services provider, and an ML pipeline used by the IT services provider may automatically feed the received information and documents to at least one generative AI model (e.g., ChatGPT, BARD, or the like) to train the chatbot. Consequently, the information and documents fed to the generative AI model may be output, leaked, or otherwise made accessible to unintended users or systems.

SUMMARY

Aspects of the disclosed technology include methods, apparatuses, systems, and computer-readable media associated with securing machine learning (ML) training pipelines and ML pipeline models (collectively referred to as "pipelines") using data loss prevention (DLP). A DLP ML engine may use different levels of detection to determine whether a command, such as a command being executed or a command to be executed, utilizes algorithms that manipulate or disseminate sensitive data. Beginning with a first level of detection, the DLP ML engine progress through the different levels of detection where each level of detection may engage different methods for determining whether the command is used for generative AI purposes. If a level of detection determines that the command is not being used for generative AI purposes, then the DLP ML engine may flag the command as "allowed." Alternatively, if a level of detection is unable to determine whether the command is used for generative AI purposes, then the DLP ML engine may advance to the next level of detection until the final level of detection is reached. The final level of detection may execute, on a test dataset, the command and may analyze the output to determine if the command executed on the test dataset was used for generative AI purposes.

Upon determining that the command is used for generative AI purposes, the DLP ML engine may store the data generated by each level of detection in a data catalog, where the data generated may describe different aspects of the command. The data generated by each level of detection may be appended to the data catalog in instances where the data catalog already contains information that describes the command. The DLP ML engine may initialize a new instance of the data catalog to store the data generated by each level of detection in instances where the data catalog does not already contain information that describes the command. The DLP ML engine may also store, in the data catalog, metadata associated with the data generated by each level of detection. The data stored in the data catalog may be, at least, partially auto-generated and immutable.

One aspect of the disclosure provides a method for implementing data loss prevention (DLP), the method comprising: identifying commands executed on data within one or more machine learning (ML) pipeline models; determining, for each of the identified commands, whether a command complies with one or more data usage policies indicating conditions for using the data in ML training; and for each of the identified commands determined not to comply with the one or more data usage policies, triggering a preventive measure. According to some examples, the commands executed on the data originate from one of: an instance of a cloud computing environment; a script; or a ML training pipeline. According to further examples, the one or more data usage policies indicate commands that are whitelisted for use in the ML training and commands that are blacklisted from use in the ML training.

According to some examples, each policy of the one or more data usage policies indicates: actions to be executed based on determining a command is whitelisted for use in the ML training; and actions to be executed based on determining the command is blacklisted from use in the ML training. According to some examples, determining whether the command complies with the one or more data usage policies comprises configuring a first layer of a DLP ML engine to: compare the command to commands that are whitelisted for use in the ML training; and based on determining: the command is a whitelisted command, flagging the command as an allowed command; or the command is a blacklisted command, triggering a second layer of the DLP ML engine.

According to additional examples, determining whether the command complies with the one or more data usage policies further comprises configuring a second layer of a DLP ML engine to: identify libraries from which the command originates; and for each identified library, inspect: a provenance of the library, an author of the library, a repository from which the library originates, a number of times the commands within the library were executed, a number of times the library is accessed, and a number of times the library experiences forking.

In the foregoing embodiments, the method further comprises determining, based on a breadth of information discovered during the inspecting, that the library and the command that originated from the library are not likely to cause data loss during the ML training. Further, in the foregoing embodiments, the method further comprises determining, based on discovering limited information during the inspecting, that the library and the command that originated from the library are likely to cause data loss during the ML training; and triggering, based on the determining, a third layer of the DLP ML engine.

In some examples, determining whether the command complies with the one or more data usage policies further comprises configuring a third layer of a DLP ML engine to: perform command pattern recognition on the command; determine, based on the command pattern recognition, whether the command is similar to a whitelisted command; and based on determining the command is similar to the whitelisted command, whitelist the command. In the foregoing embodiments, the method further comprises, based on determining the command is different from the whitelisted command, flag the command for manual review. In the foregoing embodiments, the method further comprises based on flagging the command for manual review, receiving feedback indicating an accuracy of a determination that the command is different from whitelisted commands; generating, based on the received feedback, training data; and feeding the training data to the one or more ML pipeline models during the ML training.

In the foregoing embodiments, the method further comprises based on determining the command is similar to the whitelisted command, generating a command cluster comprising the command and similar whitelisted commands; receiving feedback on the determination that the command is similar to the whitelisted command, the feedback indicating an accuracy of the determination; generating, based on the command cluster and the received feedback, training data; and feeding the training data to the one or more ML pipeline models during the ML training to generate additional command clusters.

In some examples, determining whether the command complies with the one or more data usage policies further comprises configuring a fourth layer of a DLP ML engine to: run the command on test data; compare the test data to an output of the command; determine, based on the comparing, whether the output indicates the command manipulated the test data; and based on determining the command manipulated the test data, storing the data and the command in a data catalog.

In some examples, the preventive measure includes one or more of alerting a data administrator or ceasing or preventing execution of the command.

Another aspect of the disclosure provides a generative artificial intelligence (AI) detection system comprising: one or more processors; one or more memories; and a data loss prevention (DLP) machine learning (ML) engine configured to detect generative AI having logic that causes the DLP ML engine to: identify commands executed on data within one or more ML pipeline models; determine, for each of the identified commands, whether a command complies with one or more data usage policies indicating conditions for using the data in ML training; and for each of the identified commands determined not to comply with the one or more data usage policies, trigger a preventive measure.

In some examples, determining whether the command complies with the one or more data usage policies further causes the DLP ML engine to configure a first layer of the DLP ML engine to: compare the command to commands that are whitelisted for use in the ML training; and based on determining: the command is a whitelisted command, flag the command as an allowed command; or the command is a blacklisted command, trigger a second layer of the DLP ML engine.

In the foregoing embodiments, determining whether the command complies with the one or more data usage policies further causes the DLP ML engine to configure a second layer of the DLP ML engine to: identify libraries from which the command originates; and for each identified library, inspect: a provenance of the library, an author of the library, a repository from which the library originates, a number of times the commands within the library were executed, a number of times the library is accessed, and a number of times the library experiences forking.

In the foregoing embodiments, determining whether the command complies with the one or more data usage policies further causes the DLP ML engine to configure a third layer of the DLP ML engine to: perform command pattern recognition on the command; determine, based on the command pattern recognition, whether the command is similar to a whitelisted command; and based on determining the command is similar to the whitelisted command, whitelist the command.

In some examples, triggering the preventive measure further causes the DLP ML engine to alert a data administrator or cease or prevent execution of the command.

Another aspect of the disclosure provides a non-transitory computer readable storage medium storing instructions that, when executed by a generative artificial intelligence (AI) detection system that includes one or more processors and memory for detecting generative AI, cause the generative AI detection system to: identify commands executed on data within one or more machine learning (ML) pipeline models; determine, for each of the identified commands to be executed, whether a command complies with one or more data usage policies indicating conditions for using the data in ML training; and for each of the identified commands determined not to comply with the one or more data usage policies, trigger a preventive measure.

Another aspect of the disclosure provides a method for storing generative artificial intelligence (AI) usage data in a cloud environment, the method comprising: receiving, for a plurality of commands within one or more machine learning (ML) pipeline models and determined not to comply with one or more data usage policies indicating conditions for using data in ML training, generative AI usage data associated with each command; generating metadata for each command determined not to comply with the one or more data usage policies; and storing the generative usage data and the metadata in a data catalog within the cloud environment.

In some examples, the generative AI usage data indicates that a command of the plurality of commands was used for generative AI purposes. In some examples, the generative AI usage data includes generative data asset lineage information associated with a command of the plurality of commands, wherein the generative data asset lineage information indicates that the command is a blacklisted command that is restricted from use for generative AI purposes.

Further, in some examples, the generative AI usage data further includes generative data asset lineage information associated with a command of the plurality of commands, wherein the generative data asset lineage information indicates: information that describes a library package from which the command originated; and an indication that: the library package was used for generative AI purposes; or the library package is at a high risk of being used for generative AI purposes based on a lack of information that describes the library package.

In the foregoing embodiments, the information that describes a library package includes: a provenance of the library package; an author of the library package; a repository from which the library package originates; a number of times the commands within the library package were executed; a number of times the library package is accessed; and a number of times the library package experiences forking.

In some examples, the generative AI usage data further includes generative data asset lineage information associated with a command of the plurality of commands, wherein the generative data asset lineage information indicates that, based on command pattern recognition, the command is different from whitelisted commands that are approved for execution.

In some examples, the generative AI usage data further includes generative data asset lineage information associated with a command of the plurality of commands, wherein the generative data asset lineage information indicates that, based on executing the command on a test dataset, the command is used for generative AI purposes.

In some examples, the metadata describes the one or more ML pipeline models and indicates: a name of an ML pipeline model; a unique identifier associated with the ML pipeline model; a creator of the ML pipeline model; a time that the ML pipeline model was created; a time that the ML pipeline model was last executed; a time that the ML pipeline model was last updated; and a user that last updated the ML pipeline model.

In some examples, the metadata describes one or more ML training models and indicates: a name of the ML model; a unique identifier associated with the ML model; a version number of the ML model; a creator of the ML model; a time that the ML model was created; a provenance of the ML model; a time that the ML model was last updated; and an entity that last updated the ML model.

In some examples, the metadata describes a collaboration space where the one or more ML pipeline models are implemented and indicates: a name of the collaboration space; a unique identifier associated with the collaboration space; a version of the collaboration space; a creator of the collaboration space; and a time that the collaboration space was created.

In some examples, the metadata describes information that may trigger execution of generative AI commands and indicates: a unique identifier associated with a job that may trigger automatic generative AI command execution; a unique identifier associated with a script that may trigger the automatic generative AI command execution; and user information that is manually entered to trigger the automatic generative AI command execution.

Further, in some examples, storing the generative usage data and the metadata in the data catalog comprises: determining, for each command of the plurality of commands, whether data associated with the command is stored in the data catalog; and based on determining that the data catalog comprises the data associated with the command, appending the generative usage data and the metadata to the data associated with the command to the data catalog.

In the foregoing embodiments, appending the generative usage data and the metadata comprises appending JSON objects to the data catalog.

In some examples, the data catalog further comprises generative data asset tag information, wherein the generative data asset tag information indicates that enterprise organization data associated with a command of the plurality of commands is: sensitive data; public data; or restricted data.

In some examples, data within the data catalog is auto-generated and immutable.

Another aspect of the disclosure provides a cloud system for storing generative artificial intelligence (AI) usage data, the cloud system comprising: one or more processors; a data catalog; and one or more memories comprising instructions that, when executed, cause the cloud system to: receive, for a plurality of commands within one or more machine learning (ML) pipeline models and determined not to comply with one or more data usage policies indicating conditions for using data in ML training, generative AI usage data associated with each command; generate metadata for each command determined not to comply with the one or more data usage policies; and store the generative usage data and the metadata in a data catalog within the cloud environment.

In the foregoing embodiments, storing the generative usage data and the metadata in the data catalog further cause the cloud system to: determine, for each command of the plurality of commands, whether data associated with a command is stored in the data catalog; and based on determining that the data catalog comprises the data associated with the command, appending the generative AI usage data and the metadata to the data associated with the command to the data catalog.

In the foregoing embodiments, appending the generative usage data and the metadata to the data catalog further causes the cloud system to append the generative usage data and the metadata to the data catalog as JSON objects.

Another aspect of the disclosure provides a non-transitory computer readable storage medium storing instructions that, when executed by a cloud environment for storing generative artificial intelligence (AI) usage data that includes one or more processors and memory, cause the cloud environment to: receive, for a plurality of commands within one or more machine learning (ML) pipeline models and determined not to comply with one or more data usage policies indicating conditions for using data in ML training, generative AI usage data associated with each command; generate metadata for each command determined not to comply with the one or more data usage policies; and store the generative usage data and the metadata in a data catalog within the cloud environment.

In the foregoing embodiments, the instructions, when executed, further cause the cloud environment to: determine, for each command of the plurality of commands, whether data associated with a command is stored in the data catalog; and based on determining that the data catalog comprises the data associated with the command, appending the generative AI usage data and the metadata to the data associated with the command to the data catalog.

DETAILED DESCRIPTION

Figure 1A:
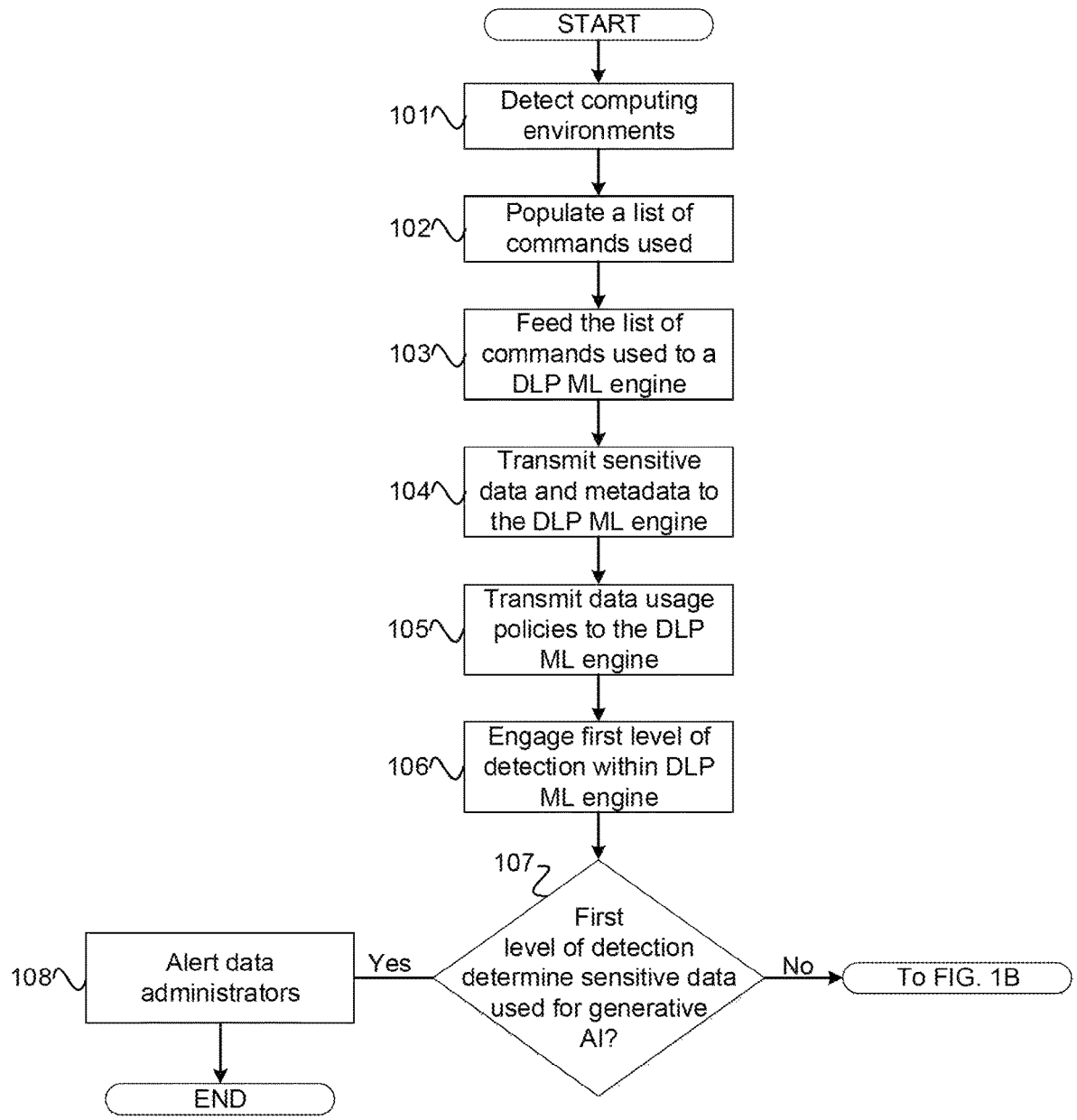
FIGS. 1A-1C are flow diagrams for an example method of securing pipelines using data loss prevention, in accordance with aspects of the disclosed technology.

This technology relates to securing machine learning (ML) training pipelines and ML pipeline models using data loss prevention. The technology addresses the unauthorized manipulation or dissemination of sensitive data in generative artificial intelligence (AI) models using a data loss prevention (DLP) ML engine. The DLP ML engine may include layers, with each layer configured to analyze a different aspect of commands executed on the sensitive data in the generative AI models. The command analysis may begin with a first layer and may progress to additional layers based on a previous layer, or a combination of previous layers, indicating that additional information may be needed to determine the commands being executed. In some instances, the technology may be implemented in trained ML models to determine whether the trained ML models use data for generative AI purposes.

The technology provides a layered approach to detecting the intended usage of sensitive data based on at least the commands that were executed using the data, commands to be executed using the data, libraries from which the commands originated, the provenance and evolution of the code derived from the libraries and run to execute the commands, the nature of synthetic data, and/or algorithms executed on the sensitive data in scripts, cloud computing instances, or other mechanisms. The data that may be generated as a result of executing commands on the sensitive data using at least one generative AI model may be referred to herein as synthetic data. If it is determined that sensitive data was used for generative AI, data administrators or other such individuals may be alerted to such use. In some instances, power users may be blocked from further accessing the sensitive data. Further, the data administrators, or a component of the system, may terminate the execution of the command or may prevent the execution of the command.

Determining that the sensitive data was used for generative AI may be done using at least one of a declarative approach or a detection approach. Under the declarative approach, the intended usage of the sensitive data may be set and DLP solutions may reflect the intended usage(s). For example, in some instances, the sensitive data may be whitelisted for use in ML models, while in other instances, the sensitive data may be blacklisted from use in ML models. The usage of the sensitive data may be monitored and compared to the intended usage(s) outlined in the DLP solutions. Additionally, or alternatively, under the detection approach, a DLP ML engine may be trained using at least permitted commands that may be executed on the sensitive data, permitted algorithms within which the sensitive data may be used, and scripts, cloud computing instances, or other mechanisms where the sensitive data may be used. As such, the DLP ML engine trained under the detection approach may detect when the commands executed on the sensitive data might not be permitted commands, when the algorithms within which the sensitive data is used might not be permitted algorithms, and when the scripts, cloud computing instances, or other mechanisms where the sensitive data is used might not be permitted. Detected misuse scenarios may be deployed as additional models and/or use cases to further train the DLP ML engine.

Figure 1B:
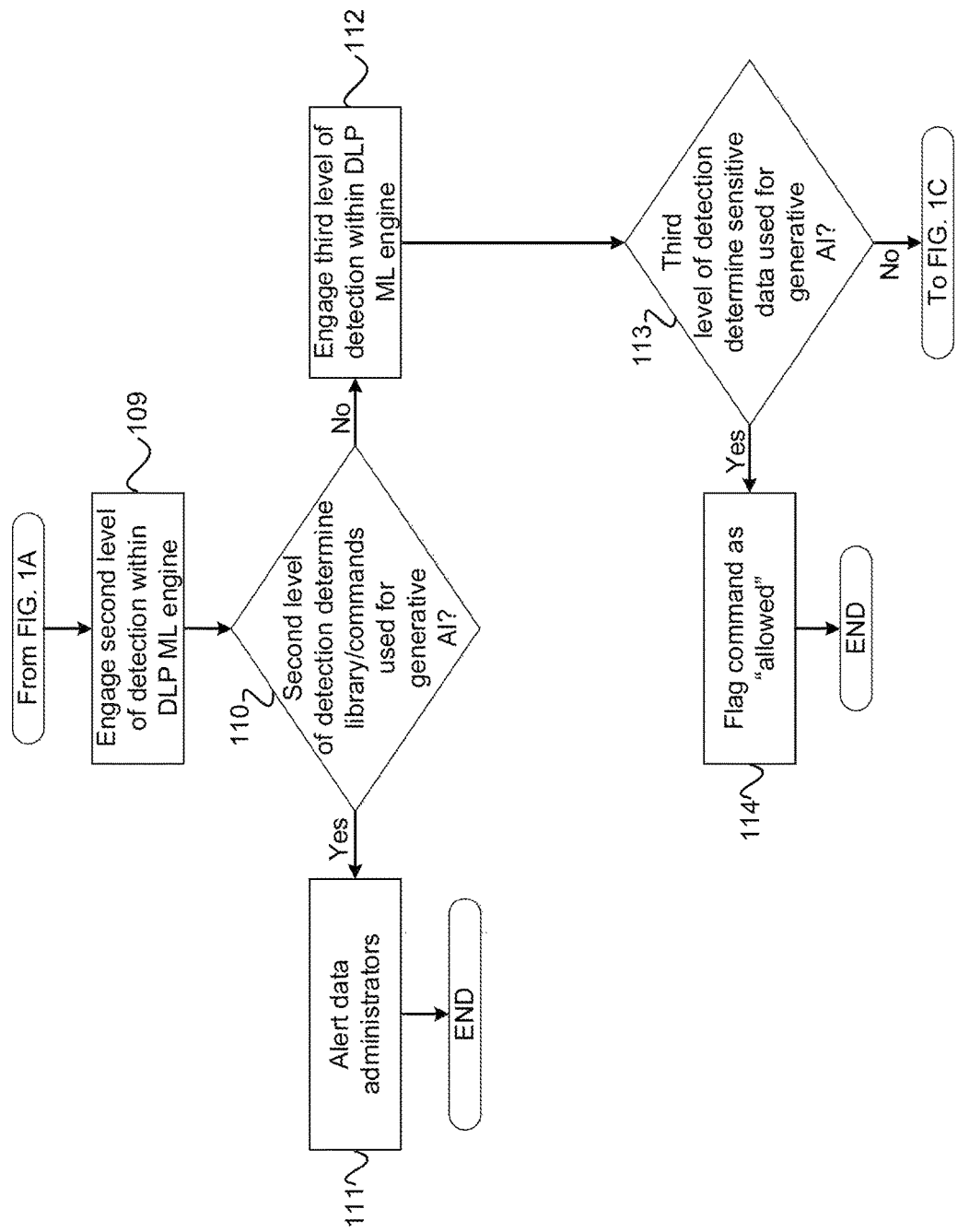
Figure 1C:
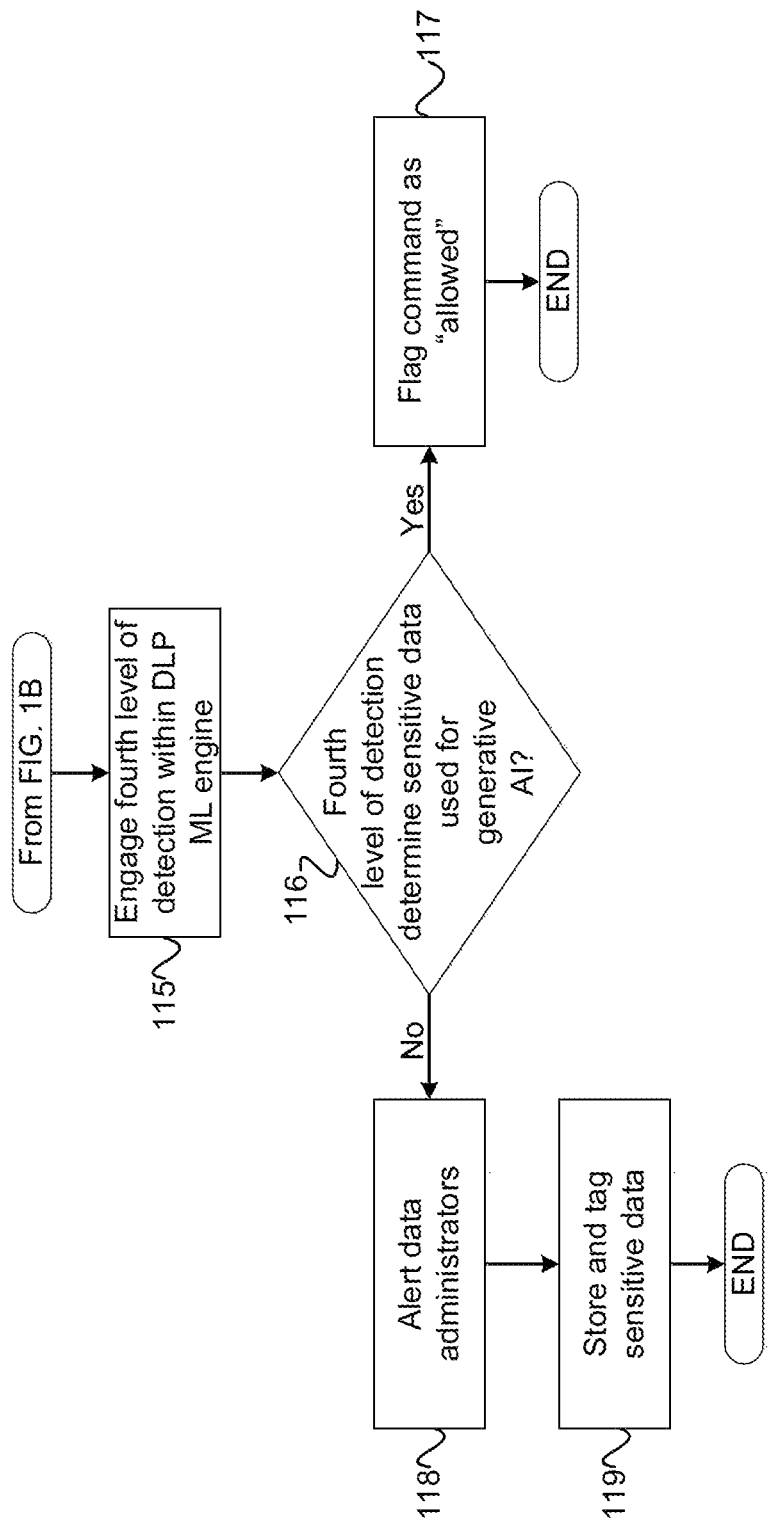

FIGS. 1A-1C illustrate an example method for securing pipelines, including machine learning (ML) training pipelines and ML pipeline models, using data loss prevention. The steps described herein are presented in the current order by way of example, and the order of steps are not meant to be limiting. Moreover, steps may be omitted and or added from the method.

Referring to FIG. 1A and at step 101, computing environments within which commands may be executed on the sensitive data may be identified. In some instances, the computing environments may be identified by personnel within an enterprise organization. Additionally or alternatively, one or more engines may be configured to continuously monitor a plurality of computing environments to detect commands to be executed on the sensitive data and algorithms that may be used to execute the commands.

Figure 2:
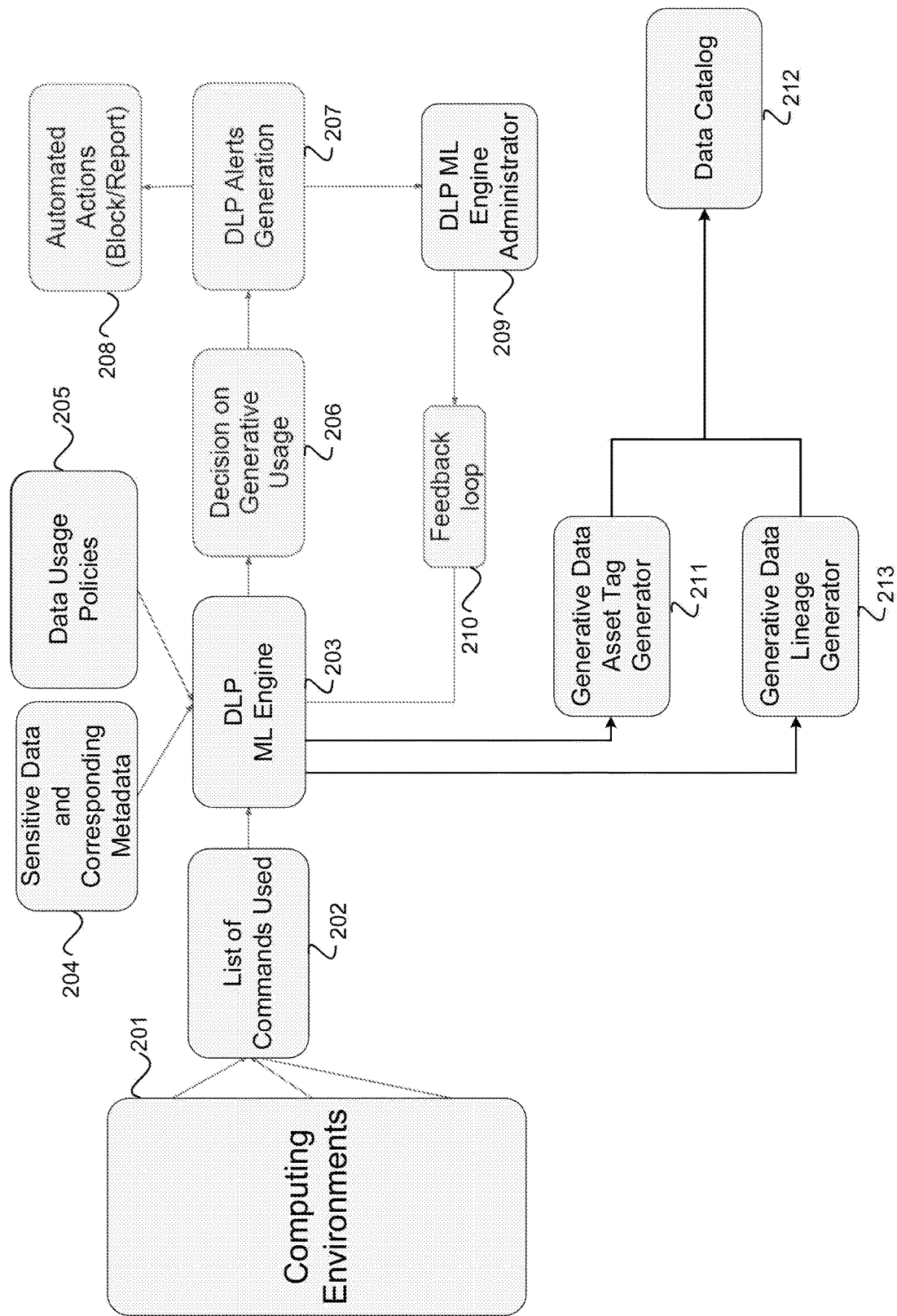
FIG. 2 illustrates example components for securing pipelines using data loss prevention, in accordance with aspects of the disclosed technology.

FIG. 2 illustrates example components for securing pipelines using data loss prevention. The components illustrated in FIG. 2 will be discussed in connection with FIGS. 1A-1C. As illustrated in FIG. 2, computing environments 201 may correspond to computing environments within which commands may be executed on the sensitive data. Computing environments 201 may correspond to local or web-based applications executing on one or more computing devices. Such applications may include, note-taking applications, scripts, computing environments where scripts may be executed, collaborative web-based workspaces, hosted workspaces, ML training pipelines, ML training models, etc.

At step 102, the detected commands and the algorithms within which the sensitive data was used, such as scripts, cloud computing instances, or other mechanisms, may be used to populate a list of commands used. The populated list of commands used corresponds to the list of commands used 202, illustrated in FIG. 2. List of commands used 202 may include the detected command as well as information extracted from the command, such as algorithms that are called during execution of the command, routines and subroutines that are called during execution of the command, etc. List of commands used 202 and the information associated with each command may be analyzed using the method described herein to determine whether the command, algorithm, routine, subroutine, or the like is used for generative AI purposes.

At step 103, list of commands used 202 may be fed to the DLP ML engine. As illustrated in FIG. 2, list of commands used 202 may be fed to DLP ML engine 203. In some instances, the enterprise organization personnel may feed list of commands used 202 to DLP ML engine 203. Additionally or alternatively, one or more engines may be configured to feed list of commands used 202 to DLP ML engine 203.

At step 104, DLP ML engine 203 may receive the sensitive data and corresponding metadata, such as sensitive data and corresponding metadata 204. The sensitive data may be tagged as sensitive, confidential, or restricted data, such as by a power user within the enterprise organization. The power user within the enterprise organization may transmit sensitive data and corresponding metadata 204 to DLP ML engine 203. In some instances, DLP ML engine 203 may tag the received data as sensitive, confidential, or restricted based on determining the sensitive data comprises personal identifiable information (PII) and/or confidential information. The corresponding metadata may be used as criteria of restriction. The criteria of restriction may describe an access policy that governs sensitive data and corresponding metadata 204. For example, the criteria of restriction may indicate that sensitive data and corresponding metadata 204 is confidential, restricted, public, or the like. An administrator of DLP ML engine 203 may use the criteria of restriction to monitor access to sensitive data and corresponding metadata 204. In some instances, the administrator of DLP ML engine 203 may apply the criteria of restriction to sensitive data and corresponding metadata 204 that is tagged as confidential data, restricted data, or data that is not meant for public access.

At step 105, DLP ML engine 203 may receive data usage policies, such as data usage policies 205, from, for example, the power user within the enterprise organization. Data usage policies 205 may be set and managed by power users and/or data administrators within the enterprise organization. Data usage policies 205 may outline a course of action to be executed based on determining sensitive data and corresponding metadata 204 was used for generative AI and/or based on determining sensitive data and corresponding metadata 204 was not used for generative AI. Further, data usage policies 205 may indicate conditions for using enterprise organization data for ML training, in ML training pipelines, or ML pipeline models, wherein the enterprise organization data may be sensitive data, restricted data, or public data. In some instances, a policy may indicate the usage of the sensitive data and corresponding metadata 204 is one of restricted, confidential, limited use, or public. DLP ML engine 203 might not process sensitive data and corresponding metadata 204 that is permitted for use in generative AI. DLP ML engine 203 may accept list of commands used 202, sensitive data and corresponding metadata 204, and data usage policies 205 as input for determining whether the sensitive data was used in generative AI.

Figure 3:
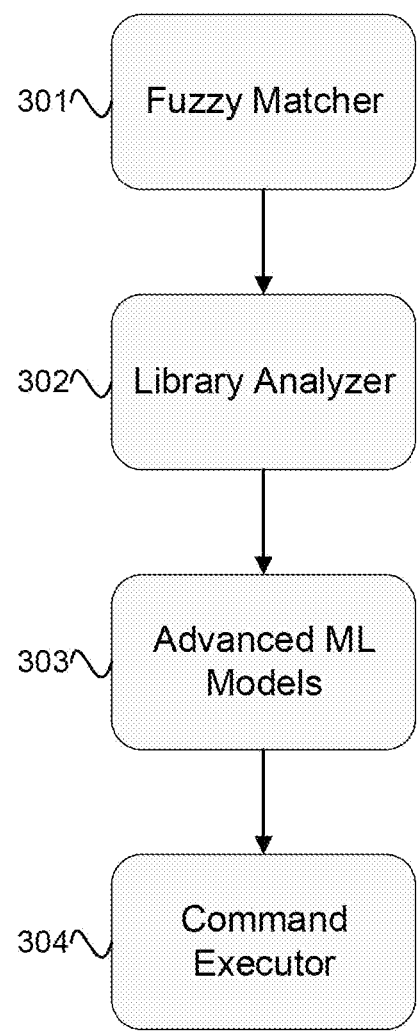
FIG. 3 illustrates example generative AI detection layers within a DLP ML engine for securing pipelines using data loss prevention, in accordance with aspects of the disclosed technology.

DLP ML engine 203 may analyze the commands within list of commands used 202 using a plurality of generative AI detection layers, varying from a first, lower level of detection to a higher level of detection. FIG. 3 illustrates example generative AI detection layers within the DLP ML engine, including fuzzy matcher 301, library analyzer 302, advanced ML models 303, and command executor 304.

As illustrated in FIG. 3, the first level of detection within DLP ML engine 203 may be fuzzy matcher 301. Referring to step 106 of FIG. 1A, a first level of detection may be engaged within the DLP ML engine. In this regard, and referring again to FIG. 3, fuzzy matcher 301 may compare list of commands used 202 to commands that are whitelisted for use in ML models and/or for generative AI. Additionally, or alternatively, fuzzy matcher 301 may compare list of commands used 202 to commands that are blacklisted from use in ML models and/or for generative AI.

At step 107, a determination is made based on the comparison of the commands to the whitelisted and/or blacklisted commands, whether sensitive data was, or may be, used in ML models or generative AI. In this regard, fuzzy matcher 301 may determine whether a command utilized sensitive data and corresponding metadata 204 for generative AI purposes. In some instances, fuzzy matcher 301 may determine whether a command is either a whitelisted command or a blacklisted command.

If, at step 107, fuzzy matcher 301 determines that a command utilized or will utilize sensitive data for ML models or generative AI purposes, then DLP ML engine 203 may alert the data administrators of the usage, as illustrated by step 108. Additionally, or alternatively, power users may be blocked from further accessing sensitive data and corresponding metadata 204. In this regard, and referring again to FIG. 2, if the decision on generative usage 206 from DLP ML engine 203 indicates that the command, including a command being executed or a command to be executed, is blacklisted, then DLP ML engine 203 may execute DLP alerts generation 207 to alert the data administrators of the usage. The data administrators may execute automated actions 208 to block the power users from further accessing sensitive data and corresponding metadata 204 or to report the power users. Reporting the power users may include further restricting the capabilities and data access authorization of the power users.

In some instances, DLP ML engine 203 may transmit the generated alerts to a DLP ML engine administrator 209 for manual review. DLP ML engine administrator 209 may review the decision on generative usage 206 from the corresponding level of detection, such as fuzzy matcher 301, and may provide feedback on the accuracy of the decision. Feedback from DLP ML engine administrator 209 may be transmitted to DLP ML engine 203, via feedback loop 210, to further train DLP ML engine 203 and the levels of detection therein.

In some instances, DLP ML engine 203 may determine that a command executed or a command to be executed did not or will not utilize sensitive data and corresponding metadata 204 and, as such, may determine that the command is a whitelisted command. Consequently, DLP ML engine 203 may flag the command as "allowed" or take no action. In some instances, this decision may be transmitted to DLP ML engine administrator 209 for manual review and feedback. Feedback from DLP ML engine administrator 209 may be transmitted to DLP ML engine 203, via feedback loop 210, and may be used to further train DLP ML engine 203 and the levels of detection therein.

Alternatively, if, at step 107, DLP ML engine 203 determines that the command is neither whitelisted nor blacklisted, then, referring to FIG. 1B and at step 109, a second level of detection may be engaged with the DLP ML engine. In this regard, and referring again to FIG. 3, DLP ML engine 203 may use a second level of detection, such as library analyzer 302. DLP ML engine 203 may require further information to determine whether the command is permitted, which may be beyond the scope of fuzzy matcher 301.

At step 110, library analyzer 302 may identify a library package that represents an origination of the command, and may inspect different aspects of the library to determine whether the library and/or commands therein were previously used to manipulate and/or disseminate data. The command may originate from at least one of a library package downloaded from at least one of computing environments 201, such as a script, a cloud computing instance, or another mechanism. Library analyzer 302 may check the source and/or provenance of the library and may identify at least the library's author, location, or standards.

The source of the library may further reveal a public repository from which the library originated. Library analyzer 302 may gauge whether information associated with a library indicates that the library or the commands therein are at a high risk of being used for generative AI purposes or at a low risk of being used for generative AI purposes. The more library analyzer 302 learns about the source, the more likely it is that library analyzer 302 may determine that the library originates from a known source and may be low risk based on the breadth of information uncovered. Alternatively, the less library analyzer 302 learns about the source due to unavailability of information, the more likely it is that library analyzer 302 may determine that the library originates from an unknown source and may be high risk based on the limited information available. Library analyzer 302 may use this distinction to gauge the obscurity of the source and the developer. The more obscure the source and/or the developer, the greater the complexity library analyzer 302 may face when determining at least how the library and corresponding commands were previously used, how frequently the library was previously accessed, or how frequently the library experienced forking.

As such, library analyzer 302 may also inspect the documentation that corresponds to the library. The documentation may describe, at least, why particular commands are used, what the commands are designed to achieve, when the commands should be executed, where improvements may be made to modify the outcome of the commands, or the like. Library analyzer 302 may run deep scans on the code within the library to identify threats and/or vulnerabilities. In some instances, library analyzer 302 may perform threat modeling with code to identify the threats and/or vulnerabilities. Threat modeling may include standard security threat modeling practices, determining whether a session is vulnerable to hijacking by an unauthorized user, and detecting improper session management. Threats may include general security threats, such as a vulnerable code path where unauthorized users may exploit data and the execution flow of such data.

If, at step 110, after the totality of the analysis by library analyzer 302, library analyzer 302 determines that the library and/or the commands are at a high risk of being used for generative AI purposes, then, at step 111, the DLP ML engine may trigger a preventive measure. In this regard, and referring again to FIGS. 2 and 3, DLP ML engine 203 may alert the data administrators of the usage and power users may be blocked from further accessing sensitive data and corresponding metadata 204. The power users may also be blocked from accessing the library and the commands therein. For example, if the decision on generative usage 206 from DLP ML engine 203 indicates that the library and commands therein are at a high risk of being used for generative AI purposes, then DLP ML engine 203 may alert the data administrators. The data administrators may execute automated actions 208 to block the power users from further accessing sensitive data and corresponding metadata 204 or to report the power users. Reporting the power users may include further restricting the capabilities and data access authorization of the power users.

In some instances, DLP ML engine 203 may transmit the generated alerts to a DLP ML engine administrator 209 for manual review. DLP ML engine administrator 209 may review the decision on generative usage 206 from the corresponding level of detection, such as library analyzer 302, and may provide feedback on the accuracy of the decision. Feedback from DLP ML engine administrator 209 may be transmitted to DLP ML engine 203, via feedback loop 210, to further train DLP ML engine 203 and the levels of detection therein.

In some instances, library analyzer 302 may determine that the library and/or the commands are at a low risk of being used for generative AI purposes, and may flag the library and commands therein as "allowed" or take no action. In some instances, this decision may be transmitted to DLP ML engine administrator for manual review and feedback. Feedback from DLP ML engine administrator may be transmitted to DLP ML engine 203, via feedback loop 210, and may be used to further train DLP ML engine 203 and the levels of detection therein.

Alternatively, if, at step 110, library analyzer 302 determines that the function of the library and/or commands is still unknown, then, at step 112, a third level of detection may be engaged within the DLP ML engine. In this regard, and referring again to FIGS. 2 and 3, DLP ML engine 203 may use a third level of detection, such as advanced ML models 303.

At step 113, advanced ML models 303 may be trained using command usage datasets, particularly novel scenarios with many unknowns that might not have been resolved by either of the first level of detection or the second level of detection. Advanced ML models 303 may be trained using supervised algorithms and may predict a probability of generative AI usage as a classifier model. Advanced ML models 303 may perform command pattern recognition to distinguish commands or combinations of commands that are likely used for generative AI purposes.

Performing command pattern recognition may include performing pattern match on a plurality of commands, similar to performing string match on expressions. Command pattern recognition may allow for more deterministic matches between commands in the plurality of commands as well as between unique commands generated by users who might not be authorized to manipulate sensitive data and corresponding metadata 204. The unique commands generated by unauthorized users might not be available within the whitelisted commands as unauthorized users may use new code bases to generate the unique commands. Advanced ML models 303 may perform probabilistic predictions, which may include predicting the unique commands that may be used for generative AI purposes. In this regard, and referring again to FIGS. 2 and 3, DLP ML engine 203 may flag predicted unique commands for manual review by DLP ML engine administrator 209. In some instances, DLP ML engine 203 may match the predicted unique commands to previously analyzed commands. Additionally, or alternatively, DLP ML engine 203 may use the predicted unique commands to train or update the blacklisted commands.

Advanced ML models 303 may also determine whether a command is similar to whitelisted commands. If the command is similar to a whitelisted command, DLP ML engine 203 may whitelist the command. Alternatively, if the command is different from the whitelisted commands, then DLP ML engine 203 may flag the command for manual review by DLP ML engine administrator 209. DLP ML engine administrator 209 may review the flagged command and may provide feedback on the accuracy of the determination that the command is different from the whitelisted commands. The feedback from the DLP ML engine administrator 209 may be fed as training data to the ML pipeline models during the ML training. Further, DLP ML engine administrator 209 may review commands that were whitelisted based on determining the commands are similar to already whitelisted commands. DLP ML engine administrator 209 may review the whitelisted command and may provide feedback on the accuracy of the determination that the command is similar to the already whitelisted commands. The feedback from the DLP ML engine administrator 209 may be fed as training data to the ML pipeline models during the ML training.

In some instances, advanced ML models 303 may be trained to perform clustering using unsupervised algorithms for associating common clusters of generative AI commands to groups of users. The clusters may be used to generate training data and the training data may be fed to the ML pipeline models during ML training to generate additional command clusters, which may be used for subsequent analyses. When combined, the pattern recognition and clustering may prepare advanced ML models 303 to track a series of commands (and/or related commands) executed by a user or to be executed by a user and/or to track the user's command execution history to determine whether sensitive data was used for generative AI purposes. Advanced ML models 303 may analyze each cluster of commands to determine whether at least one command in the cluster is whitelisted and/or whether the remaining commands are similar to the whitelisted command.

Advanced ML models 303 may be scalable and may increase in levels depending on at least the type of user activity that is tracked or the type of data that is studied. In some instances, advanced ML models 303 trained for a greater level of sophistication may use graph models as an additional method of determining whether sensitive data was used for generative AI. The output of advanced ML models 303 may loop back to an administrative entity (e.g., a programmer entrusted with supervising the advanced ML models and providing feedback accordingly) so that the administrative entity may identify areas for improvement within the current training methods and may further train advanced ML models 303 on the identified areas.

If, at step 113, after the totality of the analysis by advanced ML models 303, advanced ML models 303 determine that the commands did not use sensitive data for generative AI purposes, then, at step 114, the DLP ML engine may flag the command. In this regard, and referring again to FIG. 2, DLP ML engine 203 may flag the commands as "allowed" or take no action. In some instances, the decision on generative usage 206 may be transmitted to DLP ML engine administrator 209 for manual review and feedback. Feedback from DLP ML engine administrator 209 may be transmitted to DLP ML engine 203, via feedback loop 210, and may be used to further train DLP ML engine 203 and the levels of detection therein.

However, if, at step 113, advanced ML models 303 cannot determine whether sensitive data and corresponding metadata 204 was used for generative AI purposes, then, referring to FIG. 1C and at step 115, a fourth level of detection may be engaged within the DLP ML engine. In this regard, and referring again to FIGS. 2 and 3, DLP ML engine 203 may run command executor 304, a level of detection greater than the third level, to eliminate unknowns. DLP ML engine 203 may use command executor 304 due to the ingrained difficulty in predicting the nature of libraries and commands when the origination or provenance of the libraries may be unknown or poorly documented. DLP ML engine 203 may implement command executor 304 in cases where each of the previous levels of detection failed to determine whether sensitive data and corresponding metadata 204 was used for generative AI.

At step 116, command executor 304 may run commands from list of commands used 202 on a test dataset that may be generated and maintained by the enterprise organization. The test dataset may comprise at least one of text data, multimedia data, or various data structures. DLP ML engine 203 may analyze the output of command executor 304 to identify evidence of data manipulation and/or a generative AI approach. The output analysis may further determine the nature of the algorithms that were executed using the test dataset, such as generative AI commands, diffusion models, or the like.

If, at step 116, command executor 304 determines that the commands were not used for generative AI purposes, then, at 117, the DLP ML engine may flag the commands. In this regard, and referring again to FIGS. 2 and 3, DLP ML engine 203 may flag the commands as "allowed" or take no action. In some instances, this decision may be transmitted to DLP ML engine administrator 209 for manual review and feedback. Feedback from DLP ML engine administrator 209 may be transmitted to DLP ML engine 203, via feedback loop 210, and may be used to further train DLP ML engine 203 and the levels of detection therein.

Alternatively, if, at step 116, DLP ML engine 203 determines that at least one of the commands and/or libraries used on sensitive data and corresponding metadata 204 was used for generative AI purposes, then, at step 118, the DLP ML engine may trigger a preventive measure. In this regard, and referring to FIGS. 2 and 3, DLP ML engine 203 may alert the data administrators of the usage. DLP ML engine 203 may execute DLP alerts generation 207 to alert the data administrators of the usage. The data administrators may execute automated actions 208 to block the power users from further accessing sensitive data and corresponding metadata 204 or to report the power users. Reporting the power users may include further restricting the capabilities and data access authorization of the power users.

In some instances, DLP ML engine 203 may transmit the generated alerts to a DLP ML engine administrator 209 for manual review. DLP ML engine administrator 209 may review the decision on generative usage 206 from the corresponding level of detection, such as command executor 304, and may provide feedback on the accuracy of the decision. Feedback from DLP ML engine administrator 209 may be transmitted to DLP ML engine 203, via feedback loop 210, to further train DLP ML engine 203 and the levels of detection therein.

At step 119, DLP ML engine 119 may store and tag the sensitive data using cloud platform data catalog facilities and capabilities. In this regard, and referring to FIGS. 2 and 3, DLP ML engine 203 may employ generative data asset tag generator 211 and generative data lineage generator 213 to gather information on the generative aspects of the ML pipeline and append the information to a data catalog (e.g., as JSON objects) for tracking and management. The information may include at least generative data asset tag information and generative data asset lineage information. The generative data asset tag information may indicate whether the data analyzed by the levels of detection within DLP ML engine 203 corresponds to sensitive data, public data, restricted data, or other categories of data. The generative data asset lineage information may include the analysis generated by fuzzy matcher 301, library analyzer 302, advanced ML models 303, and command executor 304. The generative data asset tag information may categorize the data utilized by the commands. The generative data asset lineage information may provide a comprehensive overview of the commands, as discussed above using the levels of detection.

DLP ML engine 203 may use generative data lineage generator 213 illustrated in FIG. 2 to generate metadata that corresponds to the generative information to be added to data catalog 212. In some instances, DLP ML engine 203 may use generative data lineage generator 213 to update data catalog 212 or to generate a new instance within data catalog 212 to store generative usage data that might not correspond to the data already stored in data catalog 212. The generative usage data may include the data gathered by each level of detection within DLP ML engine 203. The metadata may describe at least an ML training pipeline or the ML pipeline model (e.g., an ML pipeline name, an ML pipeline ID, a unique identifier associated with the ML pipeline, a creator of the ML pipeline, a time that the ML pipeline was created, a time that the ML pipeline was last executed, a time that the ML pipeline was updated, an entity that updated the ML pipeline), the ML pipeline model (e.g., an ML model name, an ML model ID, a unique identifier associated with an ML model, a model version, a creator of the model, a time that the model was created, a model provenance, a time that the model was updated, an entity that updated the model), a cloud computing environment instance and/or cloud collaboration space where the ML pipeline was implemented (e.g., a collaboration space name such as a Notebook name, a unique identifier associated with a collaboration space such as a Notebook ID, a version of a collaboration space such as a Notebook version, a creator of a collaboration space such as Notebook creator, a time that a collaboration space was created such as a time that the Notebook was created), or generative trigger information (e.g., a job ID that may trigger automatic generative AI execution, a unique identifier associated with a job that may trigger automatic generative AI execution, a unique identifier associated with a scrip that may trigger automatic generative AI execution, a script ID that may trigger automatic generative AI execution, user information that may be used to manually trigger automatic generative AI execution).

In some instances, the DLP ML engine may determine whether the information to be added to the data catalog corresponds to sensitive data and corresponding metadata 204 already in the data catalog. If the information to be added corresponds to sensitive data and corresponding metadata 204 already in the data catalog, then DLP ML engine 203 may store the information with the corresponding data already in the data catalog by appending the information to the data catalog as JSON objects. To do so, DLP ML engine 203 may use generative data lineage generator 213 to append the JSON objects and to visually link all lineage information associated with sensitive data already in the data catalog. For example, generative data lineage generator 213 may generate JSON objects based on the generative usage data and the metadata, and may appended the JSON objects to the existing data catalog.

Alternatively, if the information to be added does not correspond to sensitive data and corresponding metadata 204 already in the data catalog, then DLP ML engine 203 may create a new data catalog or a new instance of data catalog 212 to store the information. Generative data lineage generator 213 may generate JSON objects based on the generative usage data and the metadata. Generative data lineage generator 213 may generate a new data catalog or a new instance of data catalog 212, and may appended the JSON objects to the new data catalog or the new instances of data catalog 212.

Storing the generative information and corresponding metadata offers a holistic solution to integrating cloud platform data catalogs with DLP ML engines such that administrative entities within the enterprise organization may track and manage instances of generative AI execution. The auto-generated information added to the data catalog may be immutable such that the information may survive deletion by rogue user or well-intentioned entities within the enterprise organization. Furthermore, tracking and managing information that corresponds to generative AI execution may be used for compliance purposes and may be presented when data security or data privacy concerns arise. Data lineage visualization and usage information mining across different data assets stored in the data catalog may allow administrative entities to view data threats at a high-level, which may allow for fine tuning of data usage policies.

Figure 4:
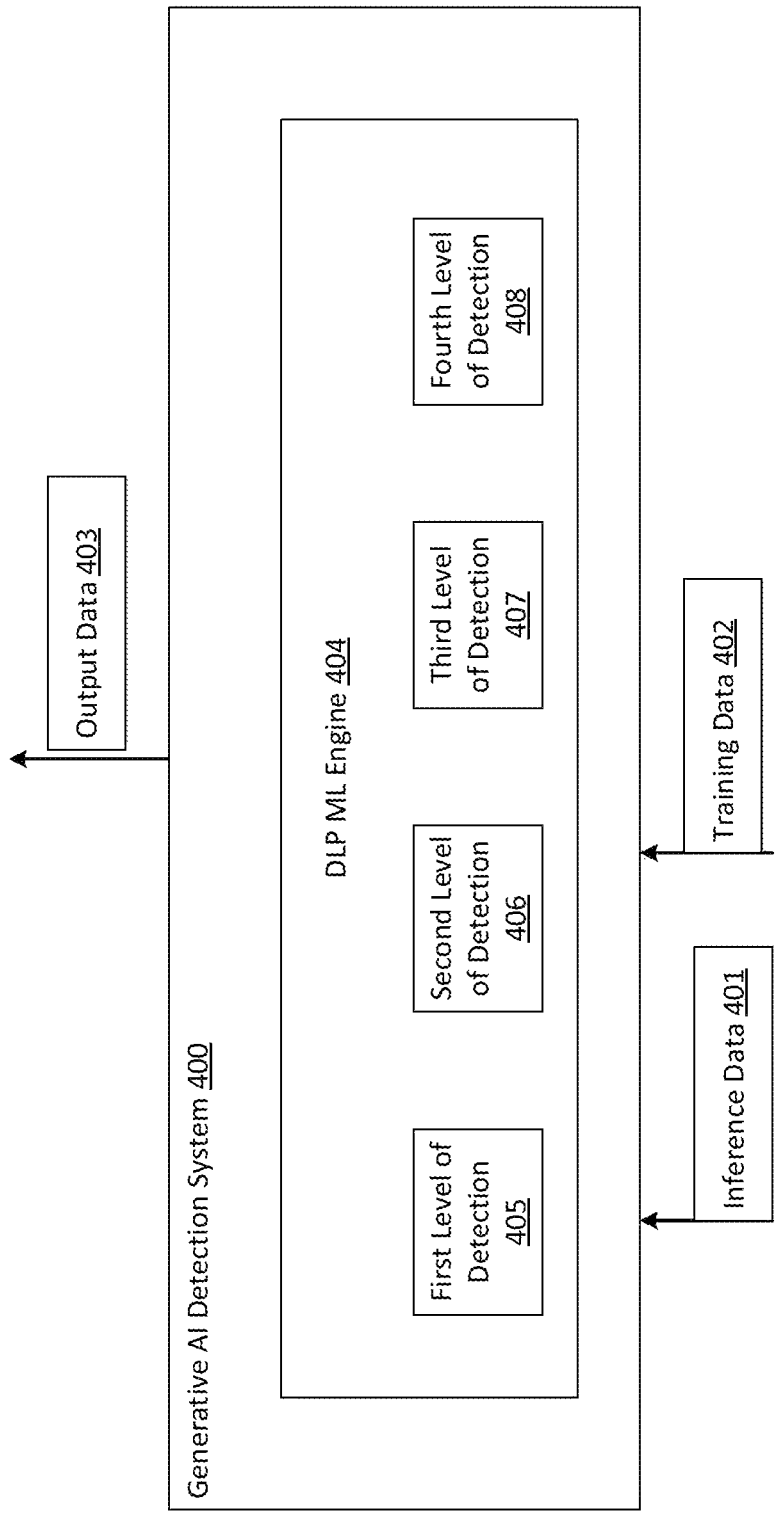
FIG. 4 illustrates a block diagram of an example generative AI detection system for securing pipelines using data loss prevention, in accordance with aspects of the disclosed technology.

FIG. 4 depicts a block diagram of an example generative AI detection system, which can be implemented on one or more computing devices. Generative AI detection system 400 can be configured to receive inference data and/or training data for use in securing pipelines using data loss prevention. For example, generative AI detecting system 400 can receive inference data 401 and training data 402 as part of a call to an application programming interface (API) exposing generative AI detection system 400 to one or more computing devices. Inference data 401 and training data 402 can also be provided to generative AI detection system 400 through a storage medium, such as remote storage connected to the one or more computing devices over a network. Inference data 401 and training data 402 can further be provided as input through a user interface on a client computing device coupled to generative AI detection system 400.

Inference data 401 can include data associated with securing pipelines using data loss prevention. In this regard, and referring to FIG. 2, inference data 401 may include sensitive data and corresponding metadata 204 that may be used in the commands, where the commands may include algorithms that manipulate the data for generative AI purposes.

Training data 402 can correspond to an artificial intelligence (AI) or machine learning task for securing pipelines using data loss prevention, such as a task performed by a neural network. Training data 402 can be split into a training set, a validation set, and/or a testing set. An example training/validation/testing split can be an 80/10/10 split, although any other split may be possible. Training data 402 can include examples for securing pipelines using data loss prevention. Training data 402 may include previous analyses performed by the levels of detection within DLP ML engine 203. In this regard, and referring to FIG. 2, training data 402 may further include feedback from DLP ML engine administrator 209, where the feedback may indicate an accuracy of previously performed analyses and guidelines for tailoring the method described above.

Training data 402 can be in any form suitable for training a model, according to one of a variety of different learning techniques. Learning techniques for training a model can include supervised learning, unsupervised learning, and semi-supervised learning techniques. For example, training data 402 can include multiple training examples that can be received as input by a model. The training examples can be labeled with a desired output for the model when processing the labeled training examples. The label and the model output can be evaluated through a loss function to determine an error, which can be backpropagated through the model to update weights for the model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The model can be trained until stopping criteria are met, such as a number of iterations for training, a maximum period of time, a convergence, or when a minimum accuracy threshold is met.

From inference data 401 and/or training data 402, generative AI detection system 400 can be configured to output one or more results related to securing pipelines using data loss prevention generated as output data. In some instances, output data 403 may include an overall determination on whether the commands contain algorithms configured to manipulate and disseminate sensitive enterprise organization data. As examples, output data 403 can be any kind of score, classification, or regression output based on the input data. Correspondingly, the AI or machine learning task can be a scoring, classification, and/or regression task for predicting some output given some input. These AI or machine learning tasks can correspond to a variety of different applications in processing images, video, text, speech, or other types of data to secure pipelines using data loss prevention. Output data 403 can include instructions associated with securing pipelines using data loss prevention.

As an example, generative AI detection system 400 can be configured to send output data 403 for display on a data administrator display. As another example, generative AI detection system 400 can be configured to provide the output data as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices.

The computer programs can also implement functionality described herein, for example, as performed by a system, engine, module, or model. Generative AI detection system 400 can further be configured to forward the output data to one or more other devices configured for translating the output data into an executable program written in a computer programming language. Generative AI detection system 400 can also be configured to send the output data to a storage device for storage and later retrieval.

Generative AI detection system 400 can include an engine, such as DLP ML engine 404. DLP ML engine 404 can be implemented as one or more computer programs, specially configured electronic circuitry, or any combination thereof. DLP ML engine 404 can be configured to engage different levels of detection, such first level of detection 405, second level of detection 406, third level of detection 407, and fourth level of detection 408. Each level may be configured to detect whether commands include algorithms that manipulate or disseminate sensitive data.

Figure 5:
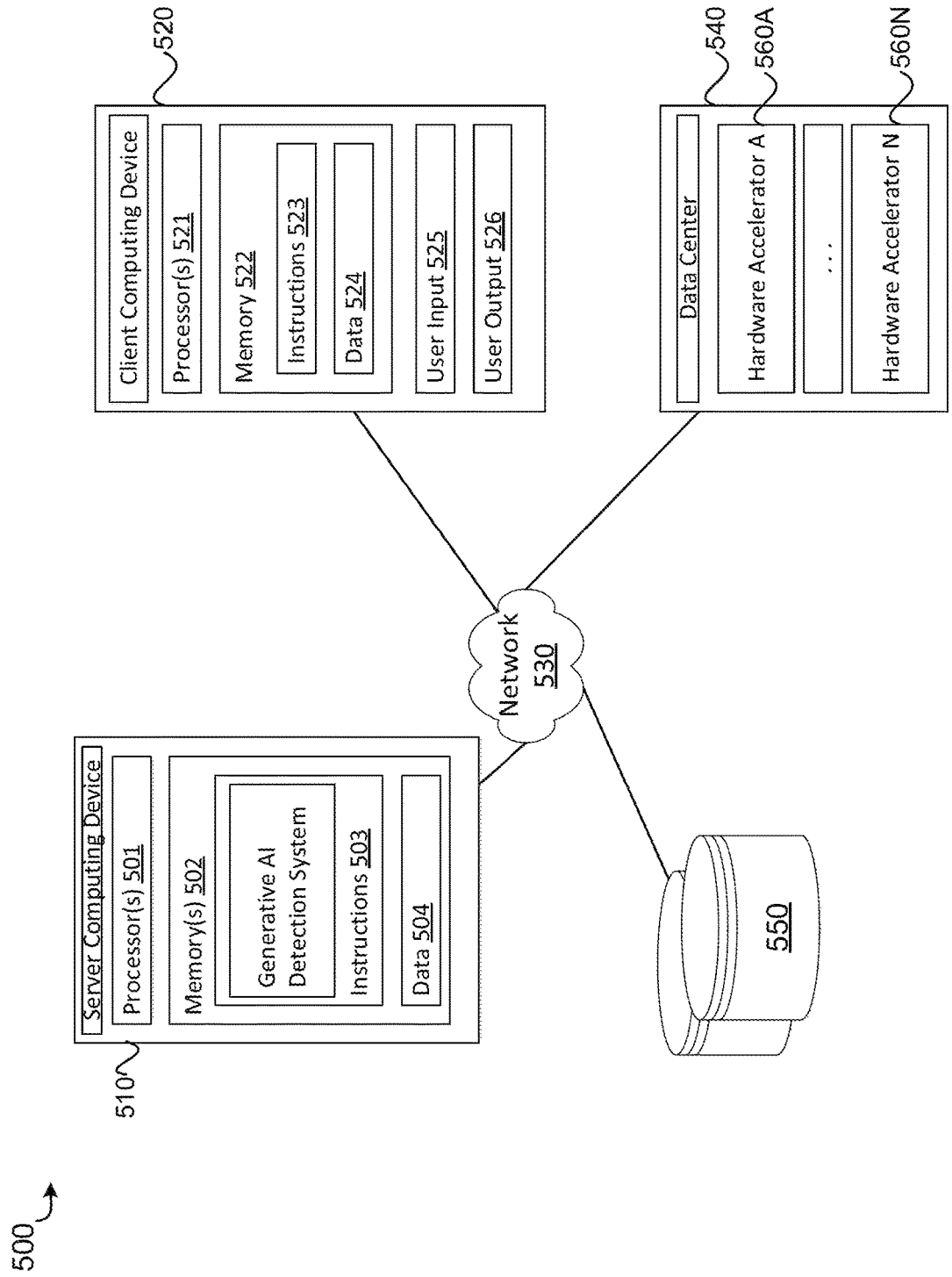
FIG. 5 illustrates a block diagram of an example environment for implementing a generative AI detection system, for securing pipelines using data loss prevention, in accordance with aspects of the disclosed technology.

FIG. 5 depicts a block diagram of an example environment for implementing a generative AI detection system. Generative AI detection system 500 can be implemented on one or more devices having one or more processors in one or more locations, such as in server computing device 510. Client computing device 520 and server computing device 510 can be communicatively coupled to one or more storage devices over a network. The storage devices can be a combination of volatile and non-volatile memory and can be at the same or different physical locations than the computing devices. For example, the storage devices can include any type of non-transitory computer readable medium capable of storing information, such as a hard-drive, solid state drive, tape drive, optical storage, memory card, ROM, RAM, DVD, CD-ROM, write-capable, and read-only memories. In some instances, database 550 may store data transmitted across network 530 and between server computing device 510, client computing device 520, and data center 540.

Server computing device 510 can include one or more processors and memory, such as processor(s) 501 and memory(s) 502. Memory(s) 502 can store information accessible by processor(s) 501, including instructions 503 that can be executed by processors 501. Memory(s) 502 can also include data 504 that can be retrieved, manipulated, or stored by the processors. Memory(s) 502 can be a type of non-transitory computer readable medium capable of storing information accessible by processor(s) 501, such as volatile and non-volatile memory. The processors can include one or more central processing units (CPUs), graphic processing units (GPUs), field-programmable gate arrays (FPGAs), and/or application-specific integrated circuits (ASICs), such as tensor processing units (TPUs).

Instructions 503 can include one or more instructions that, when executed by the processor(s) 501, cause the one or more processors to perform actions defined by instructions 503. Instructions 503 can be stored in object code format for direct processing by the processors, or in other formats including interpretable scripts or collections of independent source code modules that are interpreted on demand or compiled in advance. Instructions 503 can include instructions for implementing a generative AI detection system, which can correspond to generative AI detection system 400 of FIG. 4. The generative AI detection system can be executed using the processors, and/or using other processors remotely located from server computing device 510.

Data 504 can be retrieved, stored, or modified by the processors in accordance with the instructions. Data 504 can be stored in computer registers, in a relational or non-relational database as a table having a plurality of different fields and records, or as JSON, YAML, proto, or XML documents. Data 504 can also be formatted in a computer-readable format such as, but not limited to, binary values, ASCII, or Unicode. Moreover, data 504 can include information sufficient to identify relevant information, such as numbers, descriptive text, proprietary codes, pointers, references to data stored in other memories, including other network locations, or information that is used by a function to calculate relevant data.

Client computing device 520 can also be configured similarly to server computing device 510, with one or more processors 521, memory(s) 522, instructions 523, and data 524. Client computing device 520 can also include user input 525 and user output 526. User input 525 can include any appropriate mechanism or technique for receiving input from a user, such as keyboard, mouse, mechanical actuators, soft actuators, touchscreens, microphones, and sensors. User output 526 can alternatively or additionally include one or more speakers, transducers or other audio outputs, a haptic interface or other tactile feedback that provides non-visual and non-audible information to the platform user of client computing device 520.

Client computing device 520 can be configured to transmit data to server computing device 510, and server computing device 510 can be configured to display at least a portion of the received data on a display.

Although FIG. 5 illustrates the processors and the memories as being within the computing devices, components described herein can include multiple processors and memories that can operate in different physical locations and not within the same computing device. For example, some of the instructions and the data can be stored on a removable SD card and others within a read-only computer chip. Some or all of the instructions and data can be stored in a location physically remote from, yet still accessible by, the processors. Similarly, the processors can include a collection of processors that can perform concurrent and/or sequential operation. The computing devices can each include one or more internal clocks providing timing information, which can be used for time measurement for operations and programs run by the computing devices.

Server computing device 510 can be connected over network 530 to data center 540 housing any number of hardware accelerators. Data center 540 can be one of multiple data centers or other facilities in which various types of computing devices, such as hardware accelerators, are located. Computing resources housed in the data center can be specified for deploying models related to securing pipelines using data loss prevention, as described herein.

Data center 540 may include a plurality of hardware accelerators, such as hardware accelerators 560A-N. Hardware accelerators 560A-N can be any type of processor, such as a CPU, GPU, FPGA, or ASIC such as a TPU.

Hardware accelerators 560A-N may communicate with an ML pipeline model or an ML pipeline training model, where the model may feature a plurality of layers. An architecture of the model can refer to characteristics defining the model, such as characteristics of layers for the model, how the layers process input, or how the layers interact with one another. For example, the model may be a convolutional neural network (ConvNet) that includes a convolution layer that receives input data, followed by a pooling layer, followed by a fully connected layer that generates a result. The architecture of the model can also define types of operations performed within each layer. For example, the architecture of a ConvNet may define that rectified linear unit (ReLU) activation functions are used in the fully connected layer of the network. One or more model architectures can be generated that can output results associated with securing pipelines using data loss prevention.

Server computing device 510, client computing device 520, and data center 540 may be capable of direct and indirect communication over the network. For example, using a network socket, client computing device 520 can connect to a service operating in data center 540 through an Internet protocol. The devices can set up listening sockets that may accept an initiating connection for sending and receiving information. The network itself can include various configurations and protocols including the Internet, World Wide Web, intranets, virtual private networks, wide area networks, local networks, and private networks using communication protocols proprietary to one or more companies. The network can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network, in addition or alternatively, can also support wired connections between the devices and the data center, including over various types of Ethernet connection.

Although a single server computing device, client computing device, and data center are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

Server computing device 510 can be configured to receive requests to process data from client computing device 520 on computing resources in data center 540. For example, the environment can be part of a computing platform configured to provide a variety of services to users, through various user interfaces and/or application programming interfaces (APIs) exposing the platform services. The variety of services can include securing pipelines using data loss prevention. The client computing device can transmit input data associated with securing pipelines using data loss prevention. The generative AI detection system can receive the input data, and in response, generate output data including whether commands executed or commands to be executed use algorithms that manipulate or disseminate sensitive enterprise organization data.

As other examples of potential services provided by a platform implementing the environment, server computing device 510 can maintain a variety of models in accordance with different constraints available at data center 540. For example, server computing device 510 can maintain different families for deploying models on various types of TPUs and/or GPUs housed in data center 540 or otherwise available for processing.

Figure 6:
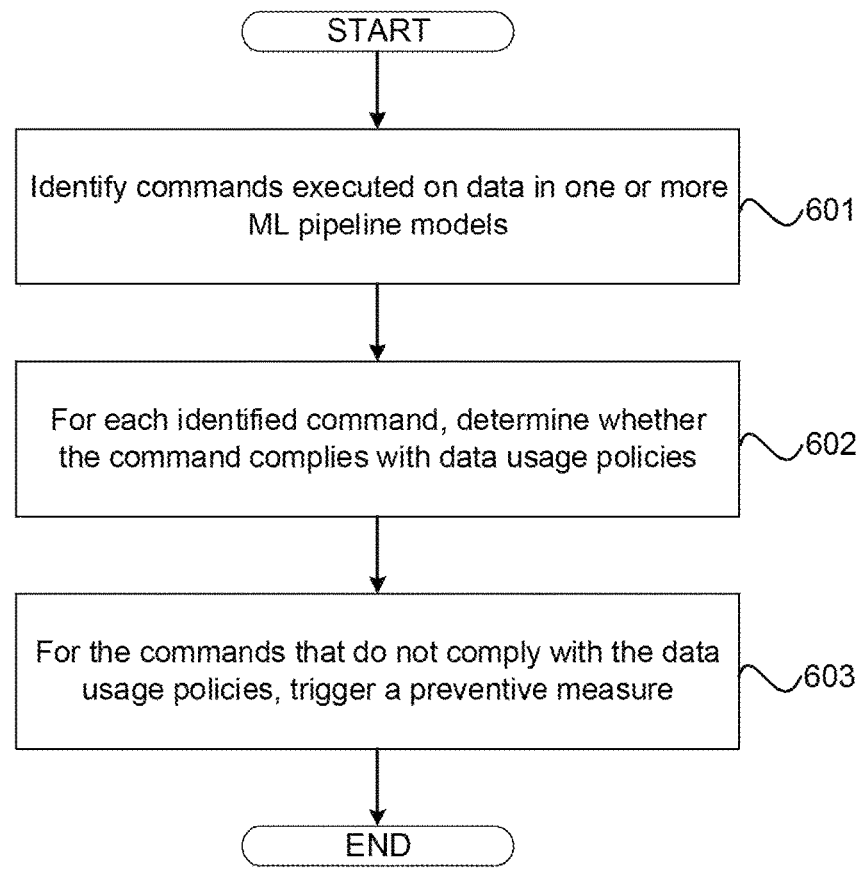
FIG. 6 illustrates an example process or method for securing pipelines using data loss prevention, in accordance with aspects of the disclosed technology.

FIG. 6 depicts a flow diagram of an example process for securing pipelines using data loss prevention. Example process 600 can be performed on a system of one or more processors in one or more locations, such as the generative AI detection system of FIG. 4.

At step 601, the generative AI detection system illustrated in FIG. 4 may identify a plurality of commands generated by users, where the plurality of commands includes commands already executed and commands to be executed. The commands may originate from one or more ML pipelines models or one or more trained ML pipelines.

At step 602, the generative AI detection system may employ a DLP ML engine to analyze the commands identified in step 601. The DLP ML engine may configure different levels of detection to analyze the commands and to determine whether the commands contain algorithms that, when executed, manipulate or disseminate sensitive enterprise organization data. Each level of detection with DLP ML engine may have increasing amount of computing power, the present level of detection having strong computing power that the previous levels of detection. Further, each level of detection may inspect a different aspect of the command such that the totality of the analysis by the DLP ML engine provides a comprehensive overview of the command.

In this regard, and referring to FIG. 3, the first level of detection may be fuzzy matcher 301, which may compare the commands identified in step 601 to whitelisted commands and blacklisted commands. If fuzzy matcher 301 determines that an identified command is a whitelisted command, then the DLP ML engine may flag the identified command as "allowed" and analysis of the command may terminate. If fuzzy matcher 301 determines that the identified command is a blacklisted command, then the DLP ML engine may alert data administrators that sensitive data was used in a blacklisted command. The data administrators may identify the user responsible for the identified command and may restrict the user's access to the sensitive data.

Alternatively, if fuzzy matcher 301 is unable to determine whether the identified command is a whitelisted command or a blacklisted command, then the DLP ML engine may engage the next level of detection, illustrated as library analyzer 302 in FIG. 3.

Library analyzer 302 may identify a library package from which the identified command originated and may perform a deep dive to collect information on the library. Library analyzer 302 may use the information collected on the library to inspect the library and determine whether the library or the commands that originate therein were previously used for generative AI purposes. If library analyzer 302 determines that the library or the commands therein were not previously used for generative AI purposes or that the library documentation indicates that the library and commands are at a low risk of being used for generative AI purposes, then the DLP ML engine may flag the identified command as "allowed" and analysis of the command may terminate. Alternatively, if library analyzer 302 determines that the library was previously used for generative AI purposes or that the lack of library documentation indicates that the library and commands are at a high risk of being used for generative AI purposes, then the DLP ML engine may alert the data administrators of the usage of the library. The data administrator may identify the user responsible for calling the library and may take preventive actions to restrict the user's access to sensitive enterprise organization data.

However, if library analyzer 302 determines that further information is needed to determine whether the library and commands therein are at risk of being used for generative AI purposes, then the DLP ML engine may engage the next level of detection, illustrated as advanced ML models 303 in FIG. 3.

Advanced ML models 303 may use trained datasets to further analyze the command previously analyzed by the first and second levels of detection. Advanced ML models 303 may perform command pattern recognition to distinguish commands and/or combinations of commands that are likely used for generative AI purposes. Advanced ML models 303 may also determine whether the commands are similar to whitelisted commands. If a command is similar to a whitelisted command, DLP ML engine 203 may whitelist the command. Alternatively, if the command is different from the whitelisted commands, then DLP ML engine 203 may flag the command executed for manual review.

Advanced ML models 303 may perform clustering using unsupervised algorithms for associating common clusters of generative AI commands to groups of users. When combined, the pattern recognition and clustering may prepare advanced ML models 303 to track a series of commands (and/or related commands) executed by a user or to be executed by a user and/or to track the user's command execution history to determine whether sensitive data was used for generative AI purposes. Advanced ML models 303 may analyze each cluster of commands to determine whether at least one command in the cluster is whitelisted and/or whether the remaining commands are similar to the whitelisted command.

If advanced ML models 303 determine that the identified command did not use sensitive data for generative AI purposes, then DLP ML engine may flag the identified command as "allowed" and analysis of the identified command may terminate. If advanced ML models 303 determines that the identified command used sensitive data for generative AI purposes, then DLP ML engine may alert data administrators of the usage. The data administrators may identify the user responsible for calling or executing the command and may restrict the user's access to sensitive enterprise organization data.

However, if advanced ML models 303 determine that further information is needed to determine whether the identified command used sensitive data for generative AI purposes, then DLP ML engine may engage the next level of detection, illustrated as command executor 304 in FIG. 3.

Command executor 304 may execute the identified command on test data, which may be generated and maintained by the enterprise organization. DLP ML engine 203 may analyze the output of command executor 304 to identify evidence of data manipulation and/or a generative AI approach. To do so, command executor 304 may compare the data that was output as a result of executing the command to the data that was input to analyze the difference between the input data and the output data.

If command executor 304 determines, after executing the identified command on test data, that the command does not use algorithms that manipulate or disseminate sensitive data, then DLP ML engine may flag the identified command as "allowed" and analysis of the command may terminate. However, if command executor 304 determines that the command uses algorithms that manipulate or disseminate sensitive data, then DLP ML engine may alert the data administrators of the usage. Consequently, the data administrators may identify the user responsible for calling or executing the command, and may restrict the user's access to sensitive data accordingly.

At step 603, the DLP ML engine may trigger a preventive measure for each command that does not comply with data usage policies. As discussed in conjunction with step 602, the levels of detection within DLP ML engine may determine that an identified command used sensitive data for generative AI purposes. As such, DLP ML engine may trigger a preventive measure, such as alerting the data administrators. Alerting the data administrators may cause the data administrators to block the user and to restrict the user's access to sensitive enterprise organization data or other enterprise organization information. Preventive measures may also include monitoring user activity to detect subsequent instances of using enterprise organization data for generative AI purposes. Therefore, step 603 may be triggered each time a level of detection within DLP ML engine determines that a command used sensitive data for generative AI purposes.

Example process 600 illustrated in FIG. 6 may be repeated for each command identified in step 601. In some instances, steps 602 and 603 may be repeated by each level of detection within the DLP ML engine until the final level of detection, or any of the preceding levels of detection, generates a final determination on whether the command was used for generative AI purposes.

Figure 7:
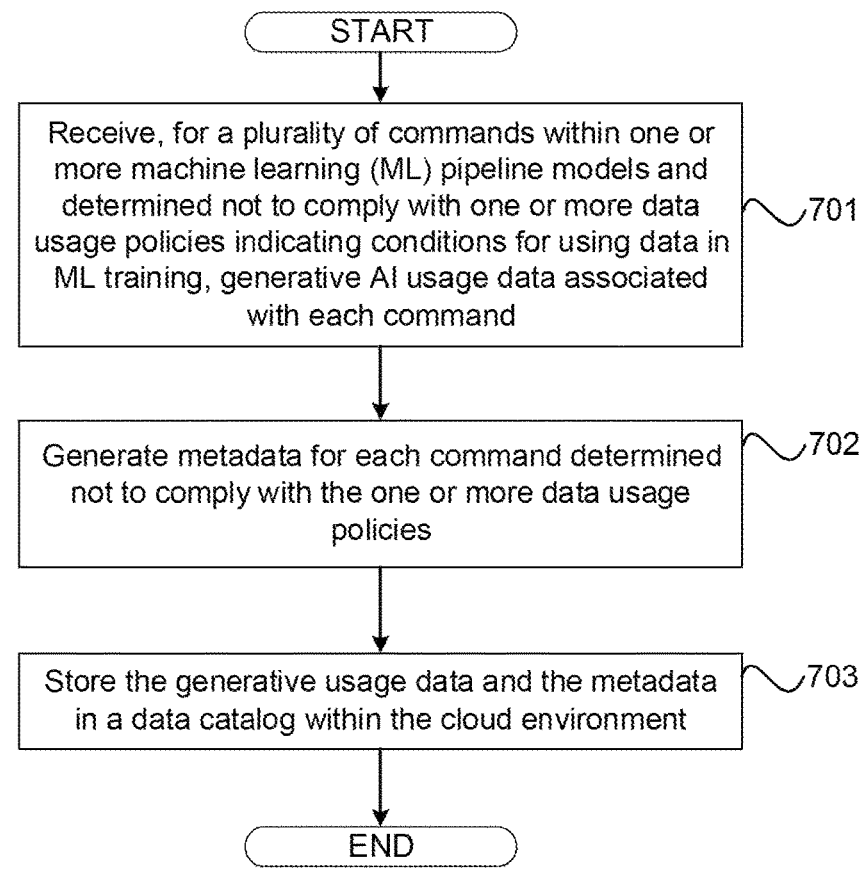
FIG. 7 illustrates an example process or method for storing generative AI usage data in a cloud environment to secure pipelines using data loss prevention, in accordance with aspects of the disclosed technology.

FIG. 7 illustrates an example process or method for storing generative AI usage data in a cloud environment to secure pipelines using data loss prevention, in accordance with aspects of the disclosed technology. Example process 700 can be performed on a system of one or more processors in one or more locations, such as the generative AI detection system of FIG. 4. Example process 700 may use the components illustrated in FIG. 2 to store generative AI usage data in the cloud computing environment. In this regard, the discussion of FIG. 7 below may refer to FIG. 2.

At step 701, generative data asset tag generator 211 and generative data lineage generator 213 may receive, from DLP ML engine 203, generative AI usage data associated with a plurality of commands to be executed, where each command of the plurality of commands is determined not to comply with one or more of data usage policies 205. Data usage policies 205 may include guidelines for using enterprise organization data in commands and may indicate situations or commands in which users should not use enterprise organization data. Commands that use enterprise organization data but are restricted from using enterprise organization data may be non-compliant with data usage policies 205.

Generative data asset tag generator 211 may analyze the received generative AI usage data to determine a classification of the enterprise data used in connection with the plurality of commands determined not to comply with one or more of data usage policies 205. In some instances, generative data asset tag generator 211 may parse a tag associated with the data, where the tag may indicate that the data is restricted data, sensitive data, public data, or another classification of data. In some instances, generative data asset tag generator 211 may parse the received generative AI usage data and may determine, based on the parsing, a tag that describes the received data. The generative data asset tag information may indicate whether the data analyzed by the levels of detection within DLP ML engine 203 corresponds to sensitive data, public data, restricted data, or other categories of data.

At step 702, generative data lineage generator 213 may use the received generative AI usage data to generate metadata for each command that is determined not to comply with one or more of data usage policies 205. In this regard, and referring to FIG. 3, generative data lineage generator 213 may use the analyses generated by fuzzy matcher 301, library analyzer 302, advanced ML models 303, and command executor 304 to generate data asset lineage information. The generative data asset lineage information may provide a comprehensive overview of the commands executed or the commands to be executed.

In particular, the metadata may describe at least an ML training pipeline, an ML pipeline model, a cloud computing environment instance and/or cloud collaboration space where the ML pipeline was implemented, and generative trigger information. Generative data lineage generator 213 may transform the metadata and the received generative AI usage data into JSON objects and may use the generated JSON objects to store the data in data catalog 212, as discussed in step 703.

At step 703, generative data lineage generator 213 may parse data catalog 212 to determine whether data catalog 212 already contains data associated with each command of the plurality of commands determined not to comply with one or more of data usage policies 205. If generative data lineage generator 213 determines that data catalog 212 already contains data associated with a command of the plurality of commands, then generative data lineage generator 213 may append the generated JSON objects associated with the command to data catalog 212. In particular, generative data lineage generator 213 may append the JSON objects to the data associated with the command that is already stored in data catalog 212. Doing so may enhance the visual representation of the history of the command and its usage.

However, if generative data lineage generator 213 determines that data catalog 212 does not contain data associated with the command, then generative data lineage generator 213 may initialize a new instance of data catalog 212 and may store the JSON objects associated with the command in the new instance of data catalog 212. In some instances, generative data lineage generator 213 may generate a new data catalog and may store the JSON objects associated with the command in the new data catalog. The JSON objects and the data stored in data catalog 212 or the new data catalog may be immutable.

The foregoing inventive aspects of this technology offer an extension of current DLP solutions for identifying sensitive and PII data, and tracking the usage of such data for generative AI. In particular, the foregoing inventive aspects offer a built-in solution designed to detect the usage of generative AI on data in ML pipeline models and to provide alerts and/or blocks to the enterprise organization administrators and/or power users. The inventive aspects may take the form of one or more software solutions that may be incorporated into current Cloud protocols.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks, such as a TensorFlow framework, a Microsoft Cognitive Toolkit framework, an Apache Singa framework, or an Apache MXNet framework, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for implementing data loss prevention (DLP), the method comprising:
   identifying, by one or more processors, one or more commands executed on data within one or more machine learning (ML) models;
   determining, by the one or more processors, for each of the identified commands, whether a command complies with one or more data usage policies indicating conditions for using the data in ML training by identifying one or more libraries from which the command originates and inspecting one or more aspects of the libraries; and triggering, by the one or more processors, for each of the identified commands determined not to comply with the one or more data usage policies, a preventive measure.

2. The method of claim 1, wherein the commands executed on the data originate from at least one of:
   an instance of a cloud computing environment;
   a script; or
   a ML training pipeline.

3. The method of claim 1, wherein the one or more data usage policies comprise commands that are whitelisted for use in the ML training and commands that are blacklisted from use in the ML training.

4. The method of claim 1, wherein the one or more data usage policies indicates:
   actions to be executed based on determining a command is whitelisted for use in the ML training; and
   actions to be executed based on determining the command is blacklisted from use in the ML training.

5. The method of claim 1, wherein determining whether the command complies with the one or more data usage policies further comprises:
   comparing the command to commands that are whitelisted for use in the ML training;
   determining that the command is a whitelisted command; and
   flagging the command as an allowed command.

6. The method of claim 1, wherein the one or more aspects of the libraries comprise at least one of:
   a provenance of the library;
   an author of the library;
   a repository from which the library originates;
   a number of times the commands within the library were executed;
   a number of times the library is accessed; or
   a number of times the library experiences forking.

7. The method of claim 1, wherein determining whether the command complies with the one or more data usage policies further comprises discovering information from the inspecting that indicates whether the command causes data loss during the ML training.

8. The method of claim 1, wherein determining whether the command complies with the one or more data usage policies further comprises discovering information from the inspecting that indicates further analysis is needed.

9. The method of claim 1, wherein determining whether the command complies with the one or more data usage policies further comprises:
   performing command pattern recognition on the command;
   determining that the command is similar to a whitelisted command; and
   whitelisting the command.

10. The method of claim 1, wherein determining whether the command complies with the one or more data usage policies further comprises:
    performing command pattern recognition on the command;
    determining that the command is different from a whitelisted command; and
    flagging the command for manual review.

11. The method of claim 10, wherein determining whether the command complies with the one or more data usage policies further comprises:
    receiving feedback indicating an accuracy of the determination that the command is different from the whitelisted commands;
    generating training data from the feedback; and
    providing the training data to the one or more ML models during the ML training.

12. The method of claim 9, wherein determining whether the command complies with the one or more data usage policies further comprises:
    generating a command cluster comprising the command and the similar whitelisted commands;
    receiving feedback indicating an accuracy of the determination that the command is similar to the whitelisted command;
    generating training data from the feedback and the command cluster; and
    providing the training data to the one or more ML models during the ML training.

13. The method of claim 1, wherein determining whether the command complies with the one or more data usage policies further comprises:
    running the command on test data;
    comparing the test data to an output of the command;
    determining that the output indicates the command manipulated the test data; and
    storing the data and the command in a data catalog.

14. The method of claim 1, wherein the preventive measure at least one of alerting a data administrator, ceasing execution of the command, or preventing execution of the command.

15. A generative artificial intelligence (AI) detection system comprising:
    one or more processors;
    one or more memories coupled to the one or more processors and storing instructions that, when executed by the one or more processors, cause the one or more processors to perform a method for implementing data loss prevention (DLP), the method comprising:
       identifying one or more commands executed on data within one or more ML models;
       determining, for each of the identified commands, whether a command complies with one or more data usage policies indicating conditions for using the data in ML training by identifying one or more libraries from which the command originates and inspecting one or more aspects of the libraries; and
       triggering, for each of the identified commands determined not to comply with the one or more data usage policies, a preventive measure.

16. The system of claim 15, wherein determining whether the command complies with the one or more data usage policies further comprises:
    comparing the command to commands that are whitelisted for use in the ML training;
    determining that the command is a whitelisted command; and
    flagging the command as an allowed command.

17. The system of claim 15, wherein the one or more aspects of the libraries comprise at least one of:
    a provenance of the library;
    an author of the library;
    a repository from which the library originates;
    a number of times the commands within the library were executed;
    a number of times the library is accessed; or
    a number of times the library experiences forking.

18. The system of claim 15, wherein determining whether the command complies with the one or more data usage policies further comprises:

performing command pattern recognition on the command;

determining that the command is similar to a whitelisted command; and whitelisting the command.

19. The system of claim 15, wherein the preventive measure comprises at least one of alerting a data administrator, ceasing execution of the command, or preventing execution of the command.

20. A non-transitory computer readable storage medium storing instructions that, when executed by one or more processors, cause the one or more processors to perform a method for implementing data loss prevention (DLP), the method comprising:

identifying one or more commands executed on data within one or more machine learning (ML) models;

determine, for each of the identified commands to be executed, whether a command complies with one or more data usage policies indicating conditions for using the data in ML training by identifying one or more libraries from which the command originates and inspecting one or more aspects of the libraries; and triggering, for each of the identified commands determined not to comply with the one or more data usage policies, a preventive measure.

* * * * *